United States Patent
Stevens

(10) Patent No.: US 8,967,020 B2
(45) Date of Patent: Mar. 3, 2015

(54) HANDLEBAR BRACE

(71) Applicant: Kevin Stevens, San Bernardino, CA (US)

(72) Inventor: Kevin Stevens, San Bernardino, CA (US)

(73) Assignee: Edge Plastics, Inc, Riverside, CA (US)

( * ) Notice: Subject to any disclaimer, the term of this patent is extended or adjusted under 35 U.S.C. 154(b) by 0 days.

(21) Appl. No.: 13/864,154

(22) Filed: Apr. 16, 2013

(65) Prior Publication Data

US 2013/0283963 A1    Oct. 31, 2013

Related U.S. Application Data

(60) Provisional application No. 61/624,829, filed on Apr. 16, 2012.

(51) Int. Cl.
*B62K 21/14*    (2006.01)

(52) U.S. Cl.
CPC ...................... *B62K 21/14* (2013.01)
USPC .......... 74/551.8; 74/551.1; 74/551.2; 403/203

(58) Field of Classification Search
CPC .............. B62K 21/14; B62J 1/04; B62J 1/08
USPC ................... 74/551.1, 551.2, 551.8; 403/203
See application file for complete search history.

(56) References Cited

U.S. PATENT DOCUMENTS

| 402,143 | A | * | 4/1889 | Colling | 74/551.2 |
|---|---|---|---|---|---|
| 2,041,704 | A | * | 5/1936 | Gordon et al. | 403/203 |
| 4,635,499 | A | | 1/1987 | McMurtrey | |
| 5,140,867 | A | * | 8/1992 | Smith | 74/551.2 |
| 5,832,785 | A | | 11/1998 | Costahaude et al. | |
| 5,950,498 | A | * | 9/1999 | Gossett et al. | 74/551.8 |
| 6,668,681 | B2 | | 12/2003 | Flum et al. | |
| 6,742,795 | B2 | * | 6/2004 | Liao | 280/274 |
| 7,350,437 | B2 | * | 4/2008 | Mangano et al. | 74/551.1 |
| 2002/0073751 | A1 | * | 6/2002 | Wilson et al. | 70/233 |
| 2014/0123804 | A1 | * | 5/2014 | Robins et al. | 74/551.1 |
| 2014/0123805 | A1 | * | 5/2014 | Robins et al. | 74/551.8 |

FOREIGN PATENT DOCUMENTS

| DE | 4007632 | A1 | * | 9/1990 | B62K 21/14 |
| DE | 4116814 | C1 | * | 7/1992 | B62K 21/14 |
| FR | 2747095 | | * | 10/1997 | B62K 21/14 |

OTHER PUBLICATIONS

EPO Machine Translation of DE 4116814 C1, Briggen, Jul. 23, 1992.*
English Abstract of DE4007632 A1, Soliani, Sep. 1990.*

* cited by examiner

*Primary Examiner* — Vinh Luong
(74) *Attorney, Agent, or Firm* — Kenneth L. Green

(57) ABSTRACT

A shock absorbing handlebar brace attached between handlebar sides. The shock absorbing handlebar brace includes a telescoping center section with a compressible rubber insert to allow the brace to slightly extend upon impacts to reduce rider fatigue.

2 Claims, 3 Drawing Sheets

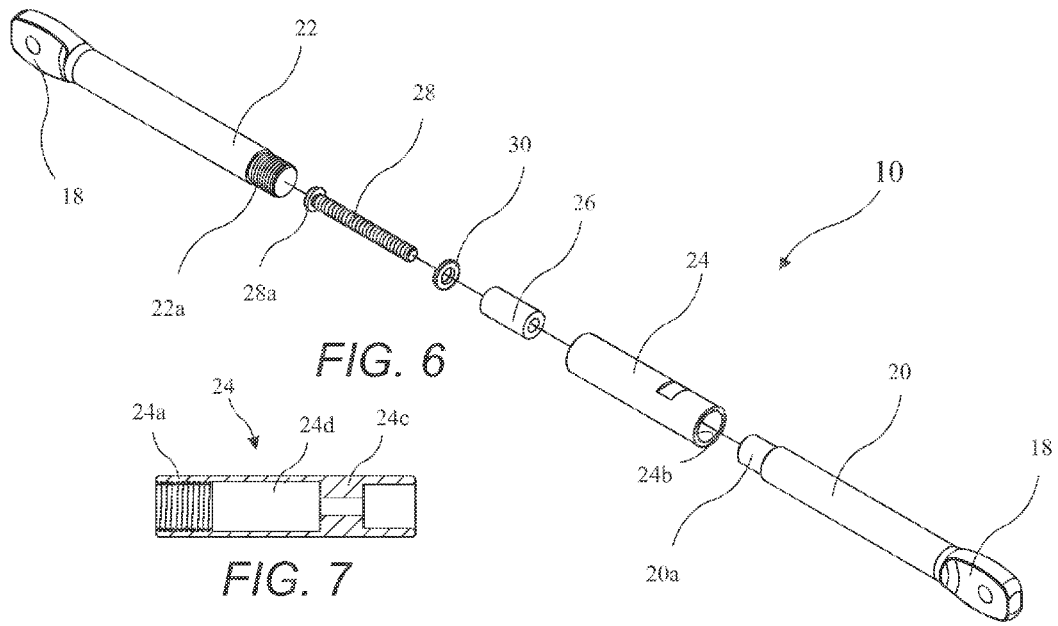
FIG. 6
FIG. 7
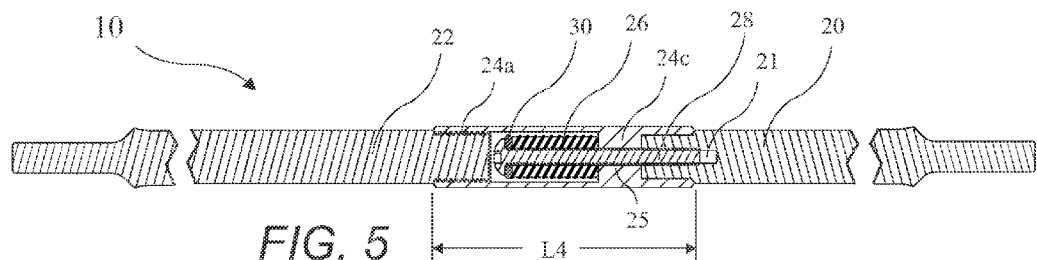
FIG. 5
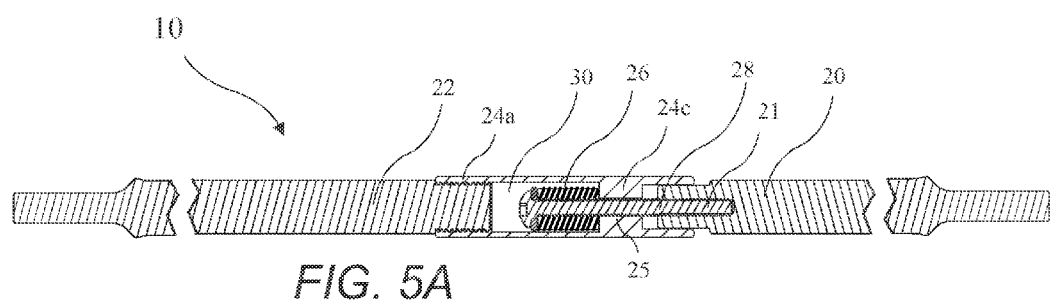
FIG. 5A

HANDLEBAR BRACE

The present application claims the priority of U.S. Provisional Patent Application Ser. No. 61/624,829 filed Apr. 16, 2012, which application is incorporated in its entirety herein by reference.

BACKGROUND OF THE INVENTION

The present invention relates to handle bars and in particular to a brace for strengthening handlebars.

Off road motorcycle and bicycle racing is widely popular. In the course of traveling over dirt roads and paths, riders often exert significant force on their handlebars. When jumps are encountered, even greater force may be exerted on the handlebars when the rider lands. These forces can easily bend and ruin the handlebars.

U.S. Pat. No. 4,635,499 discloses an inverted "U" shaped brace attached to opposite sides of the handlebars. While the brace of the '499 patent strengthens the handlebars, it also produces a sharp and unpleasant force upon landing following jumps which may result in rider fatigue and/or breakage of the handlebar portions of the handlebars outside the connection to the crossbar. A solid crossbar limiting flexing of the handlebars thereby causing the rider to absorb more of the force exerted upon landing, resulting in rider fatigue. By limiting the amount of flex in the handlebar, more force is applied to the outer section of the bar (grip area) during a landing which can cause the handlebars to break resulting in injury to the rider.

BRIEF SUMMARY OF THE INVENTION

The present invention addresses the above and other needs by providing a shock absorbing handlebar brace which is attached between handlebar sides. The shock absorbing handlebar brace includes a telescoping center section with a compressible rubber insert to allow the brace to slightly extend from a rest position to an extended position upon impacts to reduce rider fatigue.

In accordance with one aspect of the invention, there is provided a shock absorbing handlebar brace. The handlebar brace includes a left side, a right side, and a coupling connecting the left side to the right side. The left side includes a left mounting ear at a left end and a male threaded right end. The right side includes a right mounting ear at a right end, a smoothed reduced diameter left end, and a female threaded passage in the left end. The coupling includes a female threaded left end threadably cooperating with the male threaded right end of the left side, a concave cylindrical mouth at a coupling right end, and a mostly solid portion to the right of center having a fastener passage therethrough, the fastener passage coaxial with the coupling. A rubber tube resides inside the coupling to the left of the mostly solid portion. A threaded fastener runs through the rubber tube and the mostly solid portion and threads into the female threaded left end of the right side. A washer resides between a head of the threaded fastener and the rubber tube.

In accordance with another aspect of the invention, there is provided a shock absorbing handlebar brace. The shock absorbing handlebar brace allows the bars to go through a controlled flex within a set range and absorb initial impact shock without allowing the bar to flex beyond the point where the bar will bend and have a change in permanent set.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 5 shows a cross-sectional view of the shock absorbing handlebar brace according to the present invention taken along line 5-5 of FIG. 3.

FIG. 5A shows a cross-sectional view of the shock absorbing handlebar brace in an extended position according to the present invention taken along line 5-5 of FIG. 3.

FIG. 6 shows an exploded perspective view of the shock absorbing handlebar brace according to the present invention FIG. 7 shows a cross-sectional view of the coupling according to the present invention taken along line 5-5 of FIG. 3.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
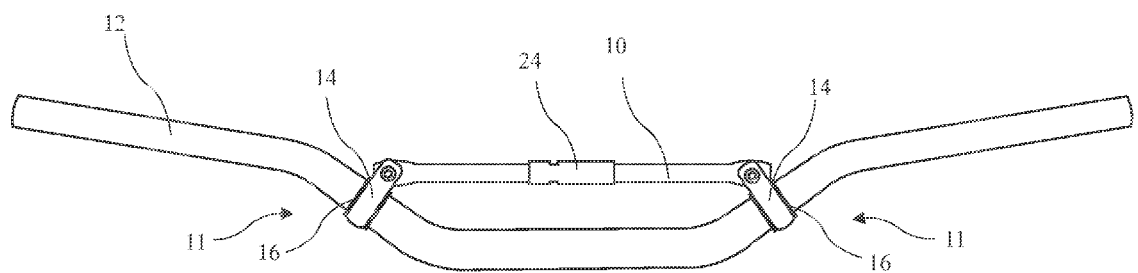
FIG. 1 shows a shock absorbing handlebar brace according to the present invention attached to handlebars.
Figure 2:
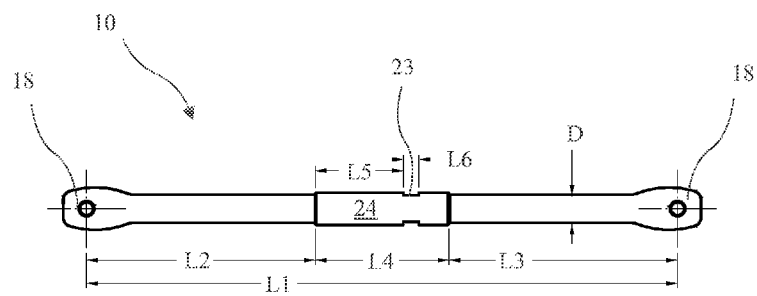
FIG. 2 shows a front view of the shock absorbing handlebar brace according to the present invention.

A shock absorbing handlebar brace 10 according to the present invention attached to handlebars 12 is shown in FIG. 1 and a front view of the shock absorbing handlebar brace 10 is shown in FIG. 2. The handlebar brace 10 includes mounting ears 18 for attachment to rising portions 11 of the handlebars 12. The mounting ears 18 may be attached to the handlebars 12 by, for example, ring clamps 14 including rubber insulation 16. The rubber insulation 16 may be provided in various thicknesses to adapt the shock absorbing handlebar brace 10 to handlebars 12 of varied diameters and contours (bends). In one embodiment, the brace has a diameter D of preferably about 12 mm and the ears 18 are a length L1, of preferably about 265 millimeters, apart.

The brace 10 includes a coupling 24 about centered on the brace 24. The coupling has a length L4 of preferably about 60 mm and has lands 23 for fitting a wrench, the lands 23 having a length L6 of preferably about 7 mm and spaced a length L5 of preferably about 40 mm from an end of the coupling 24. The coupling 24 is further spaced from a left ear 18 by a length L2 and spaced from a right ear by a length L3, the lengths L2 and L3 preferably about 102.5 mm.

Figure 4:
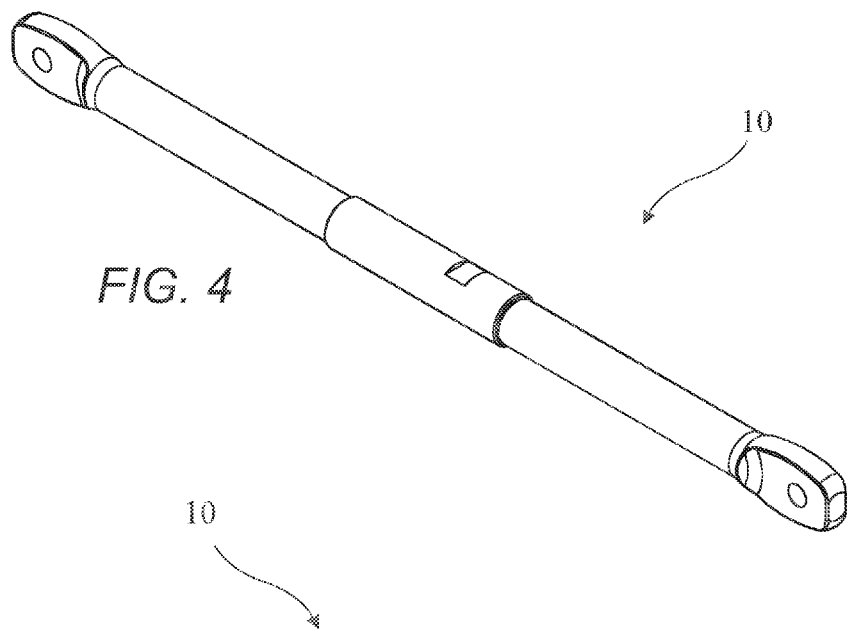
FIG. 4 shows a perspective view of the shock absorbing handlebar brace according to the present invention.
Figure 3:
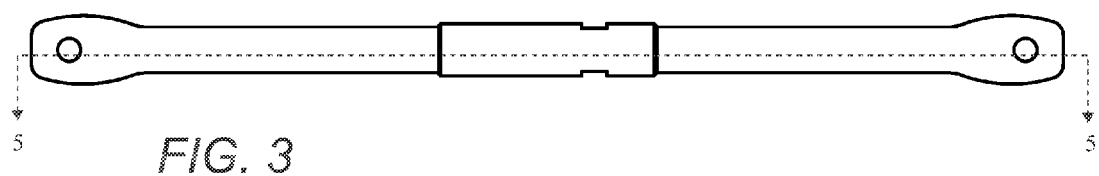
FIG. 3 shows an enlarged front view of the shock absorbing handlebar brace according to the present invention.

An enlarged front view of the shock absorbing handlebar brace 10 is shown in FIG. 3 and a perspective view of the shock absorbing handlebar brace 10 is shown in FIG. 4.

A cross-sectional view of the shock absorbing handlebar brace 10 in a rest position taken along line 5-5 of FIG. is shown in FIG. 5, cross-sectional view of the shock absorbing handlebar brace 10 in an extended position taken along line 5-5 of FIG. is shown in FIG. 5A, and an exploded perspective view of the shock absorbing handlebar brace 10 is shown in FIG. 6. The shock absorbing handlebar brace 10 includes a left side 22, a right side 20, and the coupling 24 connecting the left side to the right side. The left side 22 includes the left mounting ear 18 at a left end and a male threaded right end 22a. The right side 20 includes a right mounting ear 18 at a right end, a smoothed reduced diameter left end 20a, and a female threaded passage 21 in the left end. The coupling 24 includes a female threaded left end 24a threadably cooperating with the male threaded right end 22a of the left side 22, a concave cylindrical mouth 24b at a coupling right end, and a mostly solid portion 24c to the right of center having a fastener passage 25 therethrough coaxial with the coupling 24. A compressible member 26 residing inside the coupling 24 to the left of the mostly solid portion 24c, the compressible member 26 preferably a rubber tube. A threaded fastener 28 runs through the rubber tube 26 and the mostly solid portion 24c and threadedly into the female threaded passage 21 in the right side 20. A washer 30 resides between a head 28a of the threaded fastener 28 and the rubber tube 24. The coupling 24 has a length L of preferably approximately 60 millimeters.

A cross-sectional view of the coupling 24 taken along line 5-5 of FIG. 3 is shown in FIG. 7. The coupling 24 has the female threaded left end 24a, the mostly solid portion 20c to the right of the threaded portion 24a, and a hollow portion 24d between the female threaded left end 24a and the mostly solid portion 20c.

While the invention herein disclosed has been described by means of specific embodiments and applications thereof, numerous modifications and variations could be made thereto by those skilled in the art without departing from the scope of the invention set forth in the claims.

I claim:

1. A handlebar and handlebar brace assembly comprising:
   a pair of handlebars;
   left and right ring clamps clamped to left and right handlebar sides of the handlebars respectively;
   a left brace side having a left mounting ear at a left end and a male threaded right end, the left mounting ear attached to the left clamp;
   a right brace side having a right mounting ear at a right end and a left end having a cylindrical exterior and a female threaded passage, the right mounting ear attached to the right clamp;
   a coupling having a female threaded left end threadably cooperating with the male threaded right end of the left brace side, a concave cylindrical mouth at a coupling right end slideably cooperating with the left end of the right brace side, a hollow portion in a left coupling end, and a solid portion to the right of the hollow portion, the solid portion having a fastener passage there through coaxial with the coupling, the fastener passage having a smaller cross-section than the hollow portion, a left end of the right brace side abutting the solid portion;
   a rubber tube residing inside the hollow portion of the coupling to the left of the solid portion of the coupling;
   a threaded fastener running through the rubber tube and the solid portion of the coupling, and threaded into the female threads in the right brace side; and
   a washer between a head of the threaded fastener and the rubber tube for applying force against the rubber tube,
   wherein the brace holds the clamps together resisting bending of the handlebars which separates the clamps.

2. A handlebar brace comprising:
   a left side having a left mounting ear at a left end and a male threaded right end;
   a right side having a right mounting ear at a right end and a cylindrical reduced diameter right end and a female threaded passage in the left end;
   a coupling having a female threaded left end threadably cooperating with the male threaded right end of the left side, a concave cylindrical mouth at a coupling right end slideably cooperating with the smoothed reduced diameter left end of the right side, and mostly solid portion to the right of center having a fastener passage there through coaxial with the coupling;
   a rubber tube residing inside the coupling to the left of the mostly solid portion;
   a threaded fastener running through the rubber tube and the mostly solid portion and threaded into the female threads in the right side; and
   a washer between a head of the threaded fastener and the rubber tube.

* * * * *